United States Patent [19]
Beck

[11] Patent Number: 6,135,579
[45] Date of Patent: Oct. 24, 2000

[54] HYDRAULIC AUTOMOTIVE VEHICLE BRAKE SYSTEM WITH ANTISKID CONTROLLER

[75] Inventor: Erhard Beck, Weilburg, Germany

[73] Assignee: Continental Teves AG & Co. OHG, Germany

[21] Appl. No.: 09/147,902

[22] PCT Filed: Sep. 13, 1997

[86] PCT No.: PCT/EP97/05017

§ 371 Date: Jun. 25, 1999

§ 102(e) Date: Jun. 25, 1999

[87] PCT Pub. No.: WO98/13242

PCT Pub. Date: Apr. 2, 1998

[30] Foreign Application Priority Data

Sep. 23, 1996 [DE] Germany .......................... 196 38 898

[51] Int. Cl.⁷ ....................................................... B60T 8/40
[52] U.S. Cl. ......................................... 303/116.1; 303/10
[58] Field of Search ................................... 303/116.1, 10, 303/11, 900, 901, 113.2, 116.2, 119.2

[56] References Cited

U.S. PATENT DOCUMENTS

| | | | |
|---|---|---|---|
| 5,152,589 | 10/1992 | Ocvirk .................................. | 303/116.2 |
| 5,302,011 | 4/1994 | Volz et al. ............................. | 303/116.1 |
| 5,511,864 | 4/1996 | Reinartz et al. ....................... | 303/119.2 |
| 5,722,744 | 3/1998 | Kupfer et al. ......................... | 303/10 X |
| 6,003,958 | 12/1999 | Volz et al. ............................. | 303/116.1 |

FOREIGN PATENT DOCUMENTS

| | | |
|---|---|---|
| 0 488 833 | 6/1992 | European Pat. Off. . |
| 0 543 187 | 5/1993 | European Pat. Off. . |
| 0 606 840 | 7/1994 | European Pat. Off. . |
| 0 696 533 | 2/1996 | European Pat. Off. . |
| 0 706 923 | 4/1996 | European Pat. Off. . |
| 32 36 536 | 4/1984 | Germany . |
| 39 31 307 | 3/1991 | Germany . |
| 43 19 227 | 12/1994 | Germany . |
| 44 01 995 | 4/1995 | Germany . |
| 44 38 721 | 5/1996 | Germany . |
| 92 18363 | 10/1992 | WIPO . |
| 93 08053 | 4/1993 | WIPO . |
| 96 15926 | 5/1996 | WIPO . |

OTHER PUBLICATIONS

Search Report of the German Patent Office for German Appl. No. 196 38 898.8.

*Primary Examiner*—Robert J. Oberleitner
*Assistant Examiner*—Melanie Talavera
*Attorney, Agent, or Firm*—Rader, Fishman Grauer PLLC

[57] ABSTRACT

The present invention relates to a hydraulic automotive vehicle brake system with wheel slip control, in particular for driving dynamics control, including at least one pump and pressure modulation valves in the brake lines to control the wheel braking pressure, wherein the suction side of the pump is directly, or indirectly via the pressure modulation valves, connected hydraulically to a braking pressure generator. A diaphragm is interposed into the hydraulic connection between the braking pressure generator and the suction side of the pump and contributes to reducing the load on the sealing ring at the pump piston.

6 Claims, 1 Drawing Sheet

HYDRAULIC AUTOMOTIVE VEHICLE BRAKE SYSTEM WITH ANTISKID CONTROLLER

TECHNICAL FIELD

The present invention relates to a hydraulic automotive vehicle brake system with wheel slip control, in particular for driving dynamics control, according to the preamble of patent claim 1.

BACKGROUND OF THE INVENTION

German patent application No. 40 32 797 discloses a hydraulic automotive vehicle brake system with wheel slip control which has a pump and pressure modulation valves in the brake line to control the wheel braking pressure. The pump piston is directly acted upon by the pressure of the braking pressure generator so that the full pressure of the braking pressure generator is applied to the sealing of the pump piston. In defined cases of application, especially for operation of the pump for driving dynamics control purposes, particularly high demands are placed on the above-mentioned sealing of the pump piston in order to ensure in any case a reliable sealing of the crank chamber which is usually subjected to atmospheric pressure.

For automotive vehicle brake systems equipped with a driving dynamics control system, it is preferred to use a type of pump as disclosed in German patent application No. 32 36 536. This type of pump is characterized by a central suction channel arrangement in the pump piston. Therefore, considerable requirements are imposed on the sealing of the pump piston in relation to the eccentric chamber with a pump of this type.

An object of the present invention is to improve upon a hydraulic automotive vehicle brake system of the above-mentioned type to such effect that leakage flow via the pump piston in the direction of the eccentric chamber is prevented by least possible efforts in terms of structure and function.

According to the present invention, this object is achieved by the features characterizing patent claim 1.

Further features and advantages of the present invention can be seen in the subclaims which refer to features related to structure and circuit technique for the configuration of restrictors.

DETAILED DESCRIPTION OF THE PREFERRED EMBODIMENTS

Figure 1:
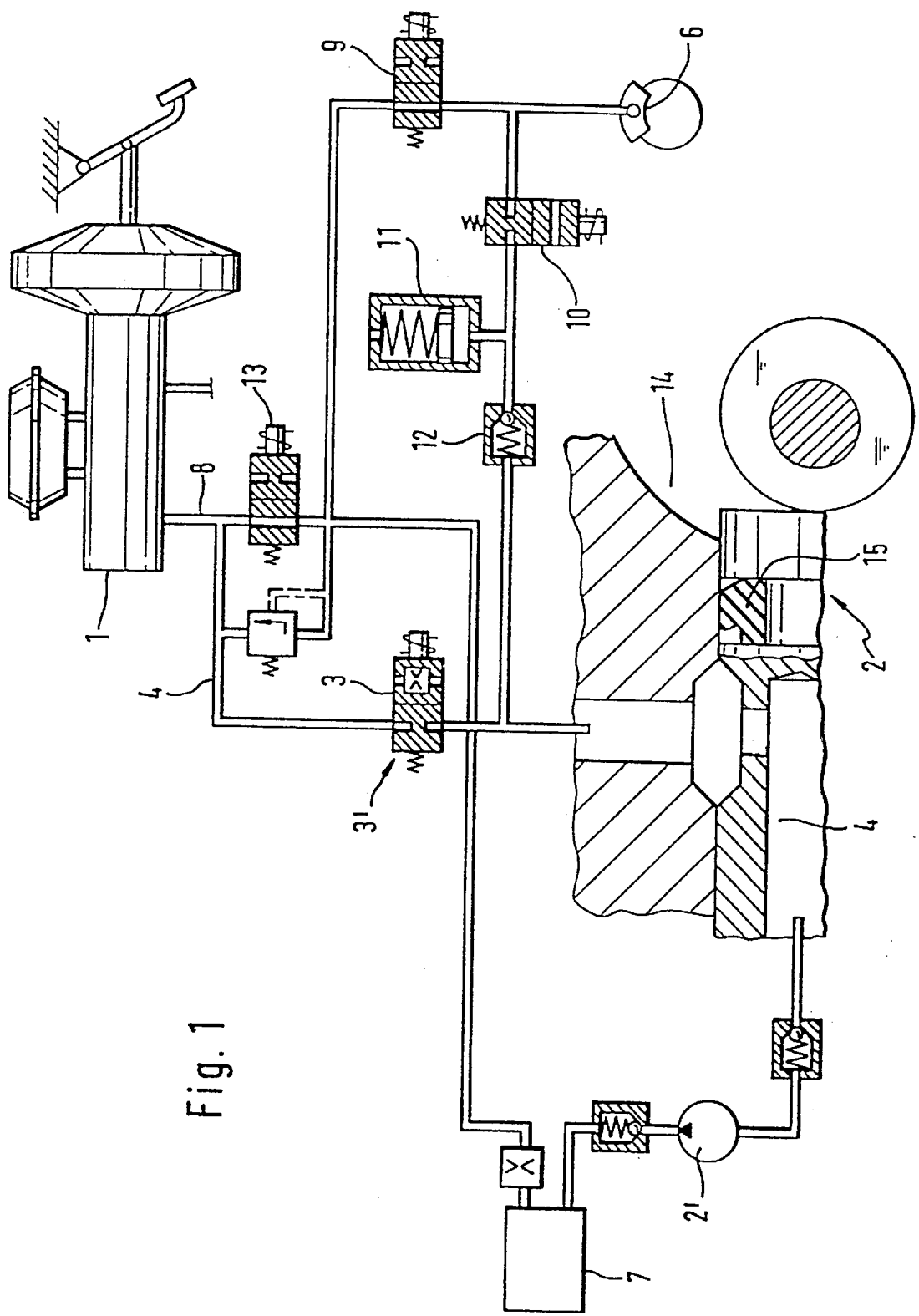
FIG. 1 is a schematic of the hydraulic system of the present invention. The essence of the present invention will be explained in the following making reference to an embodiment.

The only FIG. 1 shows the basic hydraulic circuit configuration of a hydraulic automotive vehicle brake system with wheel slip control which is appropriate for driving dynamics control in a partial view for a wheel brake circuit. Further, the drawing shows a partial cross-sectional view of the construction of a pump 2 as referred to hereinabove with respect to the state of art disclosed in German patent application No. 32 36 536. Pump 2, in the illustration chosen, performs the function of a precharging pump succeeded by a return pump 2' in order to conduct the pressure fluid volume that is supplied by the wheel brake 6, by way of a damping device 7, to the brake circuit and, thus, to brake line 8 which normally connects the braking pressure generator 1 to the wheel brake 6.

Per se known pressure modulation valves 9, 10 are used to control the wheel braking pressure. In the present embodiment, the valves are configured as an electromagnetically operable two-way/two-position inlet valve, which is open in its basic position and, downstream thereof, as an electromagnetically operable two-way/two-position outlet valve which is closed in its basic position.

Following the pressure modulation valve 10 which acts as an outlet valve is a low-pressure accumulator 11 which, in the direction of the suction side of the pump 2, is succeeded by a non-return valve 12 that is usually under a pilot pressure.

In addition to the features of the brake system which are known in the art and herewith are mentioned again, the suction conduit of the pump 2 from the pressure modulation valve 10 is followed by another suction conduit, termed as bypass line 4, which includes a diaphragm valve 3' that interrupts in its basic position the connection between the braking pressure generator 1 and the suction port of the pump 2. The diaphragm valve 3' is configured as an electromagnetically operable two-way/two-position directional control valve in the present embodiment.

To simplify the circuit arrangement, the electromagnetic actuation to adopt the diaphragm position may be dispensed with, if desired or required, provided the diaphragm function is performed by an invariable diaphragm in the bypass line 4.

The end of the bypass line 4 remote from the pump 2 is connected to the braking pressure generator 1 by way of the brake line 8 irrespective of the separating valve 13 arranged downstream thereof.

According to the present invention, the diaphragm 3 is so dimensioned in its cross-section that the rate of flow in diaphragm 3 is reduced to a rate smaller than the delivery of the pump 2. Due to this limitation of the quantity of fluid flow to the pump 2, the seal 15 which acts in the direction of the eccentric chamber 14 is stressed to a slight degree only so that this sealing may have a relatively simple configuration and the previously required manufacturing and wear tolerances have a reduced effect on the operability of the system.

The present invention permits application not only for brake systems with a precharging pump, but also applies to brake systems without precharging wherein a self-priming pump 2 is used. In a system of this type which does not require the use of a precharging pump shown in FIG. 1, the diaphragm valve 3' suggested hereinabove is replaced by a three-way/two-position directional control valve, with the basic circuit structure disclosed in FIG. 1 being maintained. For the unimpeded aspiration of fluid from the braking pressure generator 1, the three-way/two-position directional control valve is electromagnetically operable to change over from the closed first switch position to the second unrestrictedly open switch position, and is moved electromagnetically to adopt the third switch positon that includes the variable diaphragm 3 when the braking pressure generator 1 is actuated mechanically. Exactly as in the preceding embodiment according to FIG. 1, upon actuation of the working pistons in the braking pressure generator 1, the flow rate from the braking pressure generator 1 to the suction side of the pump 2 is reduced to a smaller diaphragm cross-section in the third switch position.

Thus, the seal 15 which acts in the direction of the eccentric chamber 14 is stressed to a low degree as long as the rate of the pump performance exceeds the delivery flow which is returned from the wheel brake 6 to the pump 2.

In addition, the present invention is appropriate for use in brake systems wherein the objective is to develop additional hydraulic pressure in one or more wheel brake circuits during anti-lock control operations. This may be effected, for example, by a hydraulic brake assistant function or by active pressure increase by way of a hydraulic booster. Generally, a corresponding pressure level is predetermined and sensed in the braking pressure generator 1 to this effect. When the above-mentioned diaphragm valve 3' is used, hydraulic pressure can be built up in the desired wheel brake 6 in conformity with requirements. The corresponding electric actuation of the diaphragm valve 3' to adopt the open position permits adjusting a defined pressure ratio between the wheel braking pressure and the pedal-operated hydraulic pressure of the braking pressure generator 1 during pump operation. Even during such operations, the diaphragm 3 adapted to the hydraulic pump performance ensures minimum possible stress for seal 15 because only a relatively small pressure difference is produced between the hydraulic circuit and the eccentric chamber 14 subjected to atmospheric pressure. Inasfar as the brake system includes a pressure sensor on the braking pressure generator 1, the diaphragm 3 prevents excessive pressure variations, with the result of achieving a more reliable function of the pressure sensor.

What is claimed is:

1. Hydraulic automotive vehicle brake system with wheel slip control, comprising:
   at least one pump;
   a plurality of pressure modulation valves in the brake lines to control the wheel braking pressure, wherein the suction side of the pump is directly, or indirectly via the pressure modulation valves, connected hydraulically to a braking pressure generator,
   a diaphragm interposed into the hydraulic connection between a braking pressure generator and the a suction side of the pump
   wherein the diaphragm valve which is operable electromagnetically
   wherein the diaphragm valve is configured as a three-way/two-position directional control valve which is operable preferably electrically and separates the hydraulic connection between the braking pressure generator and the pump in a first switch position, provides an unimpeded passage in the second switch position and adopts the diaphragm position in the third switch position.

2. Hydraulic automotive vehicle brake system as claimed in claim 1, wherein the function of the diaphragm is effective during operation of the pump.

3. Hydraulic automotive vehicle brake system as claimed in claim 1, wherein the rate of fluid flow in the diaphragm is smaller than the feed performance of the pump.

4. Hydraulic automotive vehicle brake system as claimed in claim 1, wherein the diaphragm valve is configured as a two-way/two-position directional control valve which is operable electrically and resides in a bypass line that connects the braking pressure generator to the suction side of the pump.

5. Hydraulic automotive vehicle brake system as claimed in claim 1, wherein the diaphragm valve adopts the third switch position instead of the second switch position when the braking pressure generator is mechanically actuated to build up hydraulic pressure.

6. Hydraulic automotive vehicle brake system as claimed in claim 1, wherein the pump is configured as a piston pump having a suction channel which opens into the piston shaft.

* * * * *